July 14, 1931. D. H. HUNTER 1,814,000
SYSTEM AND APPARATUS FOR CONTROLLING EXCESS GAS
Filed Feb. 25, 1924
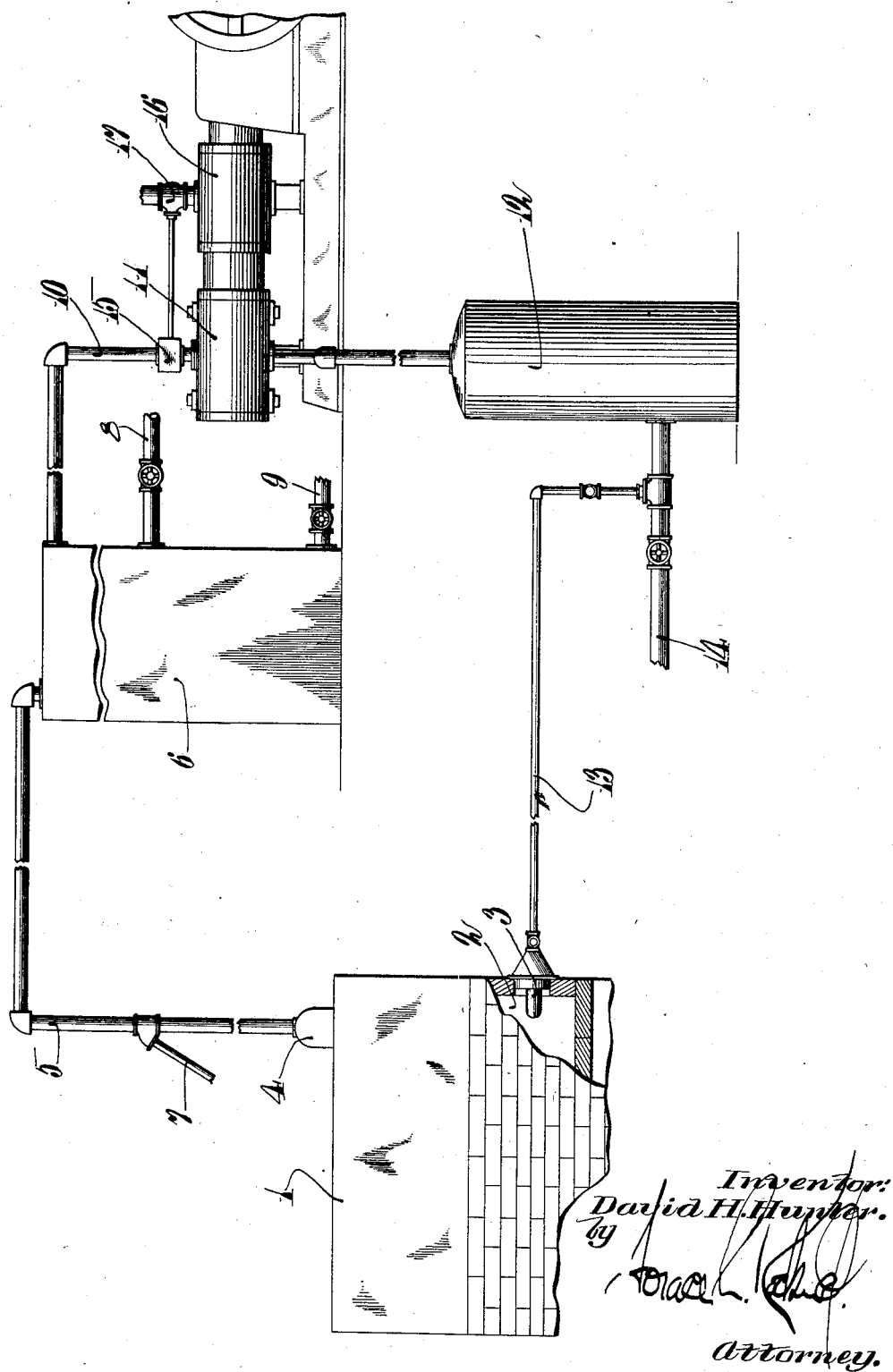
Inventor:
David H. Hunter.
by
Attorney.

Patented July 14, 1931

1,814,000

UNITED STATES PATENT OFFICE

DAVID H. HUNTER, OF DALLAS, TEXAS, ASSIGNOR TO SULLIVAN MACHINERY COMPANY, A CORPORATION OF MASSACHUSETTS

SYSTEM AND APPARATUS FOR CONTROLLING EXCESS GAS

Application filed February 25, 1924. Serial No. 694,919.

This invention relates to a system and apparatus for controlling excess gas such, for instance, as is generated in oil stills.

It has for its object to provide an improved system and apparatus for controlling the excess gas formed in a distilling apparatus. In the distillation of crude oil there is used sometimes what is known as a Fleming high pressure cracking still system and it is customary in such a system to have a safety valve on the still which blows off and relieves the pressure of the generated gases and vapors when it gets too high. The vapors so blown off are collected by suitable means, but heretofore no means have been provided, as far as I am aware, of permanently controlling the gases. The vapors are usually condensed by water and the condensed vapors, water, and the uncondensed gas pass to a receptacle which allows separation of the gas from the liquids and the liquids from each other. It has heretofore been found that with the use of such a separation tank the obnoxious gases given off escape and are very easily carried by the wind and thereby spread over the adjoining country. These gases are so obnoxious that upon the escape of the same it has been found people are actually driven from their homes and could not return as long as such gases held possession, resulting in much litigation. This condition became really a very serious problem and its solution has been attempted by many but without success. It will thus be seen that my system will add materially to the success of the Fleming cracking system for it eliminates the obnoxious features of this system and also adds materially to the income of those who use it; for the gas which is generally of a combustible nature that would ordinarily escape is led to a source of use such as the burner for the still or in some cases it is pumped into the gas mains of a city distributing system. My invention therefore has for a further object to provide a system whereby these obnoxious gases will be drawn off of an ordinary gas holder and pumped into a gas main or to a gas burner. It has for a still further object to provide a system whereby a substantially constant vacuum will be maintained on the suction side of the compressor by controlling the speed of the same and whereby the compressor acts as both a vacuum pump and compressor.

In the accompanying drawing I have shown for purposes of illustration one form which my invention may assume in practice, the figure shown being a diagrammatic view of the whole system.

In the illustrative embodiment of my invention I have shown a usual still 1 below which is a combustion chamber 2 with a usual burner 3, the source of fuel being described later. Mounted in the top of the still is a usual blow off valve 4 which is suitably constructed so as to prevent gases and vapors from escaping to the atmosphere and such construction is herein shown as comprising a pipe 5 adapted to lead the blown off gases and vapors away from the still to an ordinary gas holder 6. In order that the vapors be condensed, water is injected into the pipe 5 through a pipe 7 and thus a mixture of condensate, water and gas will be discharged from the pipe 5 into the gas holder and separator 6, although other suitable condensing means might be used. In the operation of the gas holder the water will separate to the bottom and the condensed vapors which contain a large percentage of gasoline will accumulate in the top of the holder. The gasoline may be drawn off by any suitable discharge means 8 and the water discharged through a pipe 9. Certain combustible and uncondensed obnoxious vapors and gases remain, though usually only the latter, even after the condensing step, and these collect in the top of the holder and are drawn off through a pipe 10 which leads to the intake valves of a usual compressor 11, these valves being disposed on the upper side of the compressor. The discharge of these gases takes place from the lower side of the compressor into a suitable receiver 12 from whence it may be conducted to the usual burner 3 as by a valve controlled pipe 13 or led to usual gas mains 14 such as might be used in a city.

In order to maintain a constant vacuum within the pipe 10 I have provided a usual vacuum regulator 15 disposed in the pipe 10 close to the machine. It is to be understood that this vacuum regulator is of standard construction and when a vacuum tends to be produced below a predetermined point, said regulator will gradually shut down the supply of actuating fluid to a suitable compressor engine 16 as by valve mechanism 17. At times gases are given off exceedingly rapidly, in which case the compressor will operate at its highest speed, the regulator being so set that the system will operate at its maximum efficiency.

It will thus be seen that with my improved system there is no loss of the products of crude oil as it is all consumed in one form or the other and all danger is eliminated of any obnoxious gases being spread to the detriment of the adjoining country. It will also be observed that I have provided a self-contained system in that the obnoxious gases are adapted to be disposed of within the system itself, thus not necessitating the introduction of special apparatus to take care of what has heretofore been thought of as waste material and also as a burden, for this material could not be allowed to escape over the country. It is also to be noted that by my improved system an ordinary compressor is made to serve the double function of a vacuum pump and compressor, thus automatically serving two functions in my self-contained system.

While I have in this application specifically described one form which my invention may assume in practice, it will be understood that this form of the same is shown for purposes of illustration and that the invention may be modified and embodied in various other forms without departing from its spirit or the scope of the appended claim.

What I claim as new and desire to secure by Letters Patent is:

The combination with a pressure oil cracking still having means for permitting the escape therefrom of gases and vapors on development of excess pressures therein, of condensing means to which are delivered all of said gases and vapors on their escape from said still, separator means for receiving said gases and condensed vapors from said condensing means, and means for disposing of all the gases separated including a means for compressing said gases, a supply conduit, said compressing means having its inlet connected with said separator means and its outlet connected with said supply conduit, and a means for usefully employing all the gases supplied thereto connected with said supply conduit, said compressing means being provided with controlling means adapted to handle widely varying quantities of gas and to vary the operation of the compressing means in accordance with the supply of gas.

In testimony whereof I affix my signature.

DAVID H. HUNTER.